US009111544B2

(12) United States Patent
Schmidt et al.

(10) Patent No.: US 9,111,544 B2
(45) Date of Patent: Aug. 18, 2015

(54) MONO AND MULTI-CHANNEL ECHO COMPENSATION FROM SELECTIVE OUTPUT

(75) Inventors: Gerhard Uwe Schmidt, Ulm (DE); Tim Haulick, Blaubeuren (DE); Harald Lenhardt, Ulm (DE)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 530 days.

(21) Appl. No.: 13/368,092

(22) Filed: Feb. 7, 2012

(65) Prior Publication Data

US 2012/0201396 A1 Aug. 9, 2012

Related U.S. Application Data

(62) Division of application No. 11/776,432, filed on Jul. 11, 2007, now abandoned.

(30) Foreign Application Priority Data

Jul. 11, 2006 (EP) .................................... 06014366

(51) Int. Cl.

| | |
|---|---|
| ***G10L 21/02*** | (2013.01) |
| ***H04B 3/20*** | (2006.01) |
| ***H04R 3/12*** | (2006.01) |
| *H04R 3/02* | (2006.01) |
| *G10L 21/0208* | (2013.01) |

(52) U.S. Cl.

CPC ....... *G10L 21/02* (2013.01); *G10L 2021/02082* (2013.01); *H04R 3/02* (2013.01); *H04R 2499/13* (2013.01)

(58) Field of Classification Search

CPC ....... H04M 9/08; H04M 9/082; H04M 9/085; H04M 9/087; H04B 3/02; H04B 3/20; G10L 21/02; G10L 2021/02082; H04R 3/12; H04R 2499/13

USPC ........... 704/219, 226, 227, 228; 381/2, 71.11, 381/71.1; 370/287, 290, 286; 379/406.01, 379/406.08

See application file for complete search history.

(56) References Cited

U.S. PATENT DOCUMENTS

| | | | | |
|---|---|---|---|---|
| 5,305,307 | A * | 4/1994 | Chu | 370/288 |
| 5,555,310 | A * | 9/1996 | Minami et al. | 381/17 |
| 6,263,078 | B1 * | 7/2001 | McLaughlin et al. | 379/406.08 |
| 6,580,696 | B1 * | 6/2003 | Chen et al. | 370/286 |

(Continued)

OTHER PUBLICATIONS

ITU-T Recommendation G.168: Digital Network Echo Cancellers, Aug. 2004, 112 Pages.*

(Continued)

*Primary Examiner* — Martin Lerner

(74) *Attorney, Agent, or Firm* — Daly, Crowley, Mofford & Durkee, LLP

(57) ABSTRACT

A system and method for compensating audio signal components is disclosed. The method includes detecting, by a microphone, a sound signal. The sound signal comprises audio signal components resulting from reproducing an audio signal of an audio source and speech signal components corresponding to a speech signal from a person. The sound signal is filtered to whiten the sound signal. The audio signal components in the whitened sound signal are then compensated. The whitening of the compensated sound signal is removed. The filtering of the audio signal is performed using at least two filters in an alternating way, each filter using time-dependent filter coefficients.

10 Claims, 10 Drawing Sheets

(56) References Cited

U.S. PATENT DOCUMENTS

| | | | | |
|---|---|---|---|---|
| 6,738,480 | B1 * | 5/2004 | Berthault et al. | 381/66 |
| 7,925,007 | B2 * | 4/2011 | Stokes et al. | 379/406.08 |
| 8,085,947 | B2 * | 12/2011 | Haulick et al. | 381/93 |
| 8,130,969 | B2 * | 3/2012 | Buck et al. | 381/66 |
| 8,194,872 | B2 * | 6/2012 | Buck et al. | 381/71.11 |
| 2005/0047609 | A1 * | 3/2005 | Buchner et al. | 381/66 |
| 2005/0169459 | A1 * | 8/2005 | Marton et al. | 379/406.15 |
| 2005/0213747 | A1 * | 9/2005 | Popovich et al. | 379/406.03 |
| 2006/0251261 | A1 * | 11/2006 | Christoph | 381/1 |
| 2008/0031466 | A1 * | 2/2008 | Buck et al. | 381/66 |
| 2008/0031469 | A1 * | 2/2008 | Haulick et al. | 381/73.1 |

OTHER PUBLICATIONS

European Patent Application 06 014 366.6-2225, Office Action dated Jun. 7, 2013, pp. 1-7.

Intention to Grant in European Aplication No. 06 014 366.6 dated Dec. 12, 2013, 7 pages.

Response to Office Action filed Oct. 9, 2013 in European Patent Application 06 014 366.6-1910, 24 pages.

* cited by examiner

MONO AND MULTI-CHANNEL ECHO COMPENSATION FROM SELECTIVE OUTPUT

PRIORITY APPLICATIONS

The present application is a divisional application of U.S. patent application Ser. No. 11/776,432 entitled Audio Signal Component Compensation System filed on Jul. 11, 2007, which itself claims priority to European Patent Application Serial No. 06 014 366.6 Filed on Jul. 11, 2006 entitled Method for Compensation of Audio Signal Components in a Vehicle Communication System and System Therefor both of which are incorporated herein by reference in their entity.

BACKGROUND OF THE INVENTION

1. Field of the Invention

This invention related to a communication system. More particularly, the invention relates to a method and a system for compensation of audio signal components in a communication system, such as in a vehicle communication system.

2. Related Art

The use of various types of communication systems has been proliferating over the last few years. For example, communication systems are often incorporated in vehicles for different purposes. For example, it is possible to use speech recognition and voice commands of the driver for controlling predetermined electronic devices inside the vehicle. Additionally, telephone calls, such as in a conference call, are possible with two or more passengers within the vehicle. For example, a person sitting on a front seat and a person sitting on one of the back seats may talk to a third person on the other end of the line using a hands-free communication system inside the vehicle. Moreover, it is possible to use the communication system inside the vehicle for the communication of the different vehicle passengers to each other.

In vehicle communication systems, it may be difficult to hear speech audibly and clearly due to noise, other sounds in the vehicle or attenuation of the speech sound waves. Accordingly, the voice of one of the passengers may be detected using one or more microphones positioned in different locations in the vehicle. The signal detected by the microphone can be processed and then output using the loudspeakers of an audio module that is normally located in the vehicle. The signal emitted from the loudspeaker, however, is normally also detected by the microphone. To avoid acoustic feedback or other undesirable effects, the signals detected by the microphone have to be processed and such signal components have to be filtered out. Otherwise, undesirable feedback can occur in the system.

In vehicle audio systems, it has become possible to select different modes for reproducing an audio signal. By way of example, state of the art audio systems provide the possibility to either reproduce the sound in a stereo mode or in a surround sound mode. In the surround sound mode, additional time delays may be introduced in the different audio channels of the audio signal, so that the person sitting inside the vehicle has the impression of a surround sound audio system. When this audio system having a variable time delay in the different audio channels is used in connection with a vehicle communication system, the audio signal component emitted from the loudspeakers and then detected by the microphone should be removed to avoid unwanted echoes. In a surround sound mode, the signal amplifier introduces an additional time delay into the audio channel and the audio signal component detected by the microphone is delayed by the time delay introduced by the amplifier. Accordingly, an echo compensation unit for compensating acoustic echoes, by simulating the signal path from the loudspeaker to the microphone, should be able to simulate this signal path with a variable time delay. For the echo compensation of audio signal components from a signal detected by a microphone, a method with high computing power may be necessary. The required computer power mainly depends on the length of the filter of the echo compensation units. Thus generally, the greater the length of the filter, the more computer power needed.

Furthermore, it is possible that several microphones may be used for one seat to detect the speech signal of a passenger. Negative feedback can be avoided when adaptive filters are used for filtering out echoes and feedback signal components of the signals.

In addition to the communication signals output via the loudspeakers of the vehicle, audio modules reproducing audio signals, such as radio signals or signals from a music storage device such as a compact disc, are provided in the vehicles. These audio signals are output via the same loudspeakers, and they are also recorded by the microphones and again output via, the loudspeaker. If these audio signal components are not attenuated before being output as part of the signal detected by the microphone, the driver has the impression of an audio sound signal having reverberation.

The above-described vehicle communication systems are often incorporated into expensive and highly sophisticated vehicles having highly sophisticated audio components. When the audio module is used in connection with a vehicle communication system, the sound quality is deteriorated by the feedback of the audio signal components picked up by the microphone and again fed to the loudspeakers. To avoid this signal quality degradation, the audio signal may be disabled during the in-vehicle communication, or the audio signal components detected by the microphone may be filtered out in an effective way.

For compensation of audio signal components in a sound signal (also referred to as "echo compensation"), a filter may be used to simulate the audio signal components of a sound signal that has been emitted from the loudspeaker and then detected by the microphone. However, the audio signal component may be, for example, an audio signal of a classical piece of music, a pop piece of music, or perhaps an interview without music. For all these different kinds of music, the echo compensation may have to be carried out in a different way to be effective. The audio signal components of the audio signal can have, in the case of a stereo signal for example, completely independent audio channels. In other situations, such as, for example, in the case of speaking interviews or one speaking person, the two audio signal parts of the stereo signal may be completely linear, depending on the signals. The echo compensation for linearly dependent signals is a difficult task, as the adaptation algorithms for calculating filter coefficients generally do not have a well-defined solution. When the audio signal changes from a piece of music to a person speaking, it is desirable for the filters to be adapted to the new signal characteristics. This adaptation of the filter takes a certain amount of time and during this time unwanted echoes can occur.

Moreover, echo compensation filters seek to simulate the path of the sound wave in the vehicle by calculating the pulse response. The approximation step may not result in a non ambiguous and definite answer. Particularly in cases where the audio signal may be either a mono signal or a multi-channel signal, the different channels being completely linearly dependent from each other, a multi-channel stereo echo compensation filter may have the problem of finding the correct result. In other words, the stereo echo compensation filter may not be able to accurately simulate the interior of the vehicle through which the sound passed before it is detected by the microphone in a correct way.

Accordingly, a need exists to effectively cope with the different situations that can occur in the compensation of audio signal components in an echo compensation unit, and generally for an improved system and method for compensation of audio signal components in a vehicle communication system. A need further exists to reduce the length of filters while maintaining a length sufficient to allow the echo compensation unit to be able to simulate the signal path of a stereo signal or of a signal in a surround sound mode. Yet a further need exists to effectively cope with the different situations that can occur in the compensation of audio signal components in an echo compensation unit.

SUMMARY

An echo compensation system for compensating audio signal components in a communication system is provided. The communication system may include (i) an audio unit for generating an audio signal, (ii) a microphone for receiving a sound signal, (iii) a loudspeaker for outputting the sound signal detected by the microphone and outputting the audio signal itself, (iv) an echo compensation unit for compensating the audio signal components of the sound signal, and (v) a filter for whitening the sound signal, the audio signal, or both signals. Applicants note that the term "sound signals" (which may also be referred to as "detected sound signals") refers to the signals detected by a microphone, including both audio signal components and speech signal components. The system may further include at least two filters used in an alternating way for whitening the sound signal, the audio signal, or both signals. The system may further include a sound signal having different audio channels, the time delay of the different audio channels relative to each other being adjustable.

A calculating unit may also be provided for calculating time-dependent filter coefficients. Additionally, a switch may be provided for switching the supply of the time-dependent filter coefficients to various audio signal filters. Furthermore, a second switch may also be provided to supply the simulated audio signal components to a subtracting unit, where the signal output from the echo compensation unit may be subtracted from the detected signal output. In addition, an inverse filter may be provided for removing the whitening of the whitened error signal resulting in the echo compensated sound signal, where this inverse filter may also be connected to the calculating unit.

A method for compensating audio signal components in a communication system is also provided. According to one implementation, a sound signal, comprising audio signal components and speech signal components, is detected by a microphone. The detected sound signal is then filtered in order to whiten the sound signal. After whitening the detected sound signal, the audio signal components in the sound signal are compensated. After compensation, the whitening of the compensated sound signal may be removed.

According to another implementation, filter coefficients may be calculated and supplied to two audio filters in an alternating way, to be used for whitening of signals. In such an implementation, the calculated filter coefficients may be supplied to a first filter for a first set of N cycles, and the calculated filter coefficients may be supplied to the other filter for a next set of N cycles resulting in a renewal of the filter coefficients of each filter every 2N cycles (i.e., new filter coefficients for a given filter calculated every 2N cycles).

According to another implementation of the invention, a system and method for compensating audio signal components in a communication system is provided using a mono echo compensation unit and a multi-channel (or stereo) echo compensation unit in combination. The provided echo compensation system may comprise a mono echo compensation unit for receiving one channel of an audio signal, and a multi-channel compensation unit for receiving at least two channels of the audio signal. When the audio signal changes its characteristic (for example, from music to a person speaking), either the mono echo compensation unit or the multi-channel echo compensation unit achieves the best echo compensation result. Accordingly, effective echo compensation can be achieved for any kind of audio signal.

According to yet another implementation, an echo compensation system is provided that is able to suppress audio signal components of an audio source having a variable time delay. In one implementation, the adaptation of the length of the variable time delay may be used alone, or in connection with other aspects or implementations of the invention. It is also possible that the variation of the length of the delay element may be used in combination with the time-dependent filter coefficients and/or in combination with the dual echo compensation structure of a mono echo compensation unit in combination with a multi-channel echo compensation unit, as described above.

These and other objects, features and advantages of the present invention, as well as other devices, apparatuses, systems, methods, features and advantages of the invention, will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the figures described below. The components in the figures are not necessarily to scale, emphasis instead being placed upon illustrating the principles of the invention. In the figures, like reference numerals designate corresponding parts throughout the different views.

DETAILED DESCRIPTION

While the present invention may be used in various types of communication systems, the invention will be described below with specific reference to an in-vehicle communication system as an example application of the invention.

Figure 1:
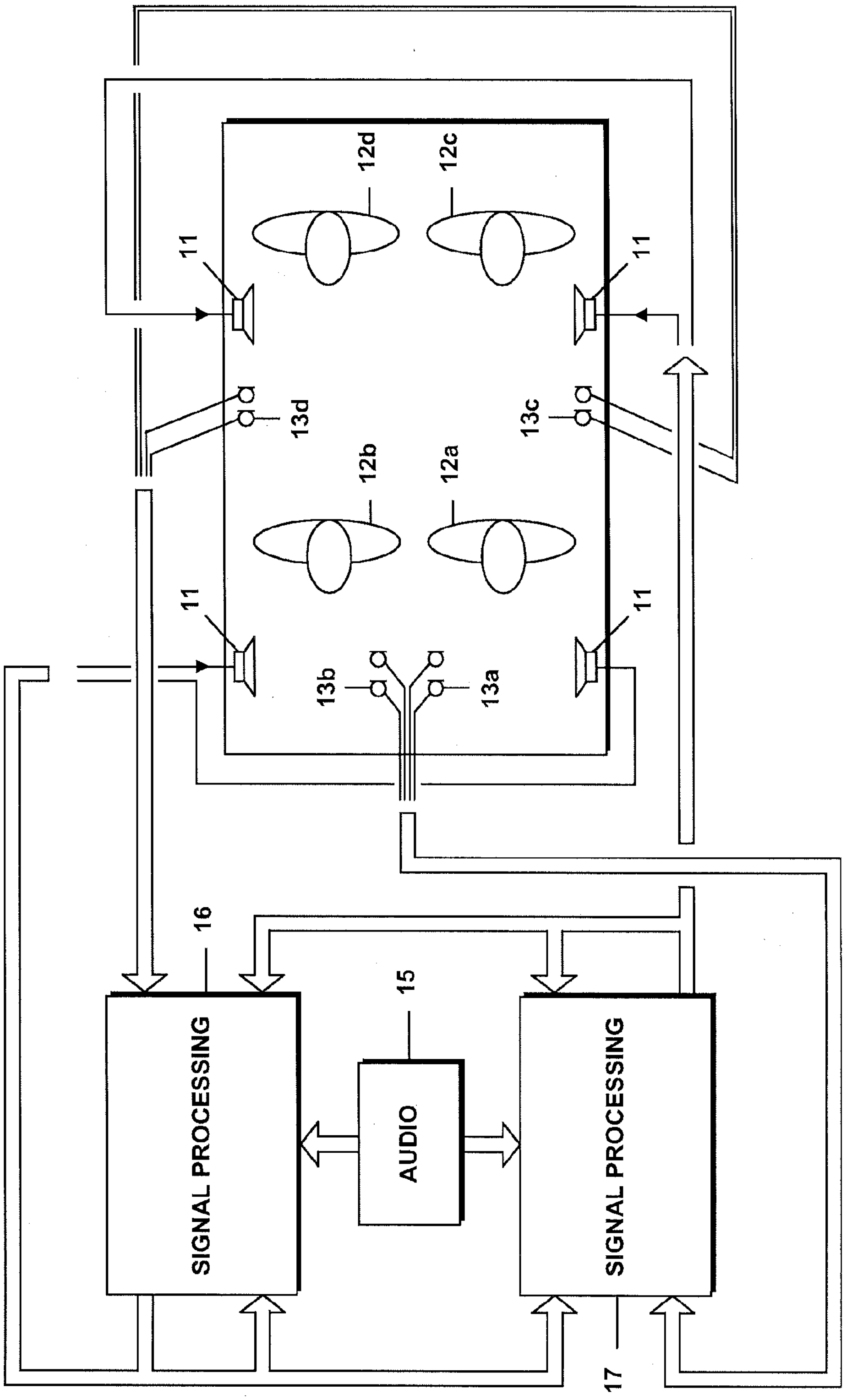
FIG. 1 shows one example of an implementation of an in-vehicle communication system in which an echo compensation system may be used.

FIG. 1 shows one example of an implementation at an in-vehicle communication system in which an echo compensation system may be used. Such an in-vehicle communication system may comprise a plurality of loudspeakers 11 via which audio signals from an audio source unit 15 are omitted. In the vehicle, different passenger positions are possible. For example, the positions may include, without limitation, the position of the driver 12*a*, the position of the front seat passenger 121), and two positions in the back 12*c* and 12*d*. When one of the passengers in the front 12*a*, 12*b* wants to communicate with one of the passengers sitting in the hack 12*c*, 12*d*, or if two passengers, one in the front and one in the hack, are communicating with a third person in a telecommunication system, one or more microphones 13*a-d* may be provided. For example, the microphones (or array, or set of microphones) may include without limitation, the following: a microphone 13*a* for detecting the speech signal of a passenger in the driver position 12*a*, a microphone 13*b* for detecting the speech signal of the front passenger 12*b*, a microphone 13*c* for detecting the speech signal of the rear passenger behind the driver 12*c*, and a microphone 13*d* for detecting the speech signal of the rear passenger behind the front seat passenger 12*d*, may be provided. One of skill in the art would understand that these microphones 13*a-d* may be positioned in other locations, or that more or fewer microphones may be used. For example, more than one microphone may be provided corresponding to a single passenger position.

When more than two microphones are used for one vehicle seat, a beam forming for the different vehicle seat positions can be done. In the example implementation illustrated in FIG. 1, signals received from the rear microphones 13*c*-13*d* may be supplied to a first signal processing unit 16 used for controlling the signal processing of speech signals from the back seats 12*c*-12*d* to the front seats 12*a*-12*b*, and a signal processing unit 17 may receive signals from the front microphones 13*a*-13*b*, and control the signal processing of speech signals from the front seats 12*a*-12*b* to the back seats 12*c*-12*d*. In one implementation, the signal processing units 16 and 17 may determine through which loudspeakers 11 of the vehicle the signals detected by the microphones 13*a*-13*d* will be output.

Figure 2:
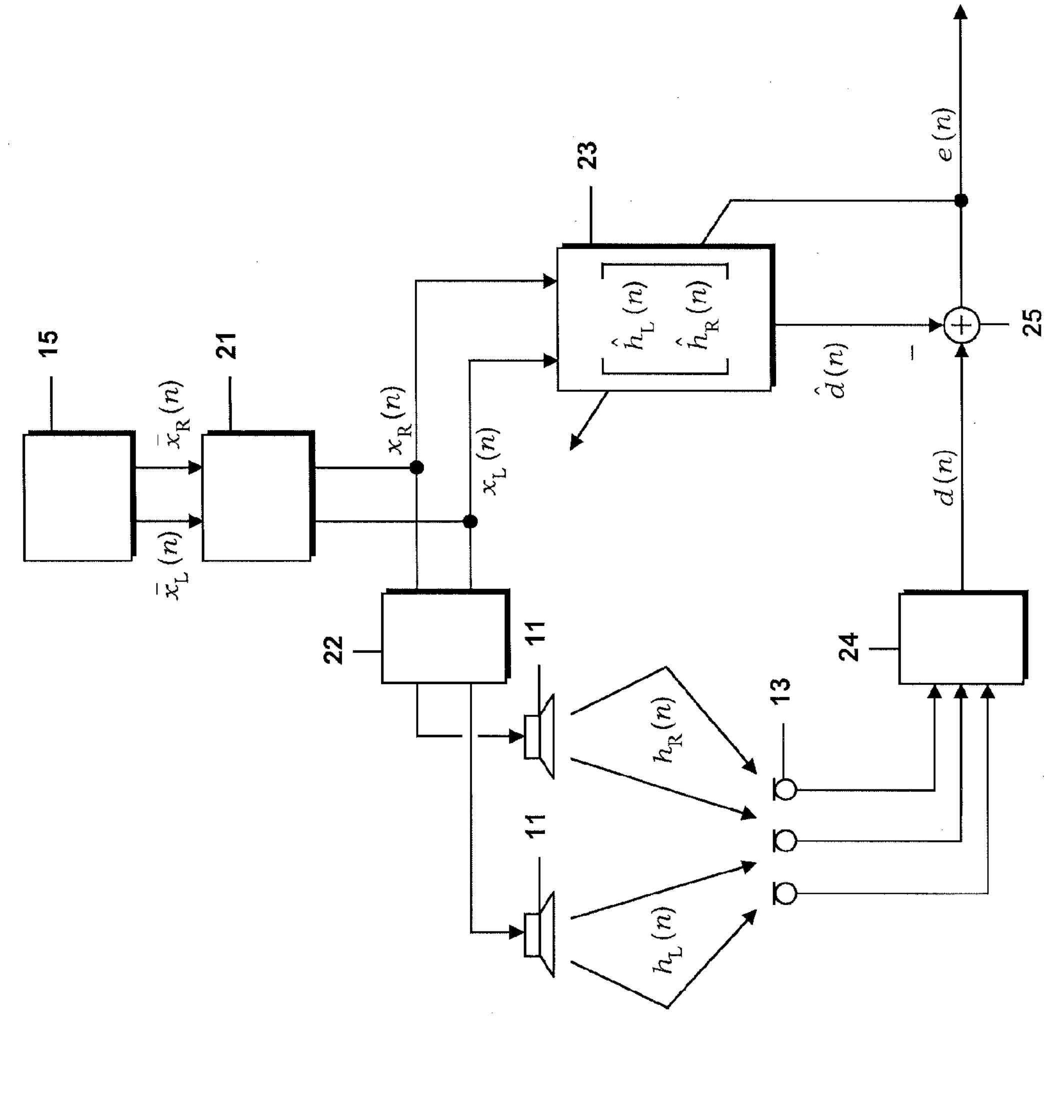
FIG. 2 shows one example of an implementation of a system used for compensating audio signal components in a communication system.

FIG. 2 shows one example of an implementation of a system used for compensating audio signal components in a communication system. In FIG. 2, an audio source unit 15 represents the audio signal source of FIG. 1 having two different audio channels, a first channel $\overline{x}_L(n)$ and a second channel $\overline{x}_R(n)$. While example a dual-channel audio signal is shown, the system also applies to multiple channel audio signals having more than two channels. The two audio signal channels (also referred to simply as audio signals) may then be transmitted to a filter unit 21 where they are either filtered in a time-variant manner or processed by a nonlinear characteristic to reduce the mutual correlation. This filtering is done to whiten or decorrelate the audio signal components, as the echo compensation system may be more effective when it is carried out on a whitened audio signal. A whitened signal generally indicates that the spectrum contains equal power per cycle, i.e., the signal has a flat spectrum that contains all different frequencies in equal amount. The filtering for whitening the audio signal furthermore decorrelates the different channels of the audio signal. One of skill in the art would understand that the filter unit 21 is optional.

The filtered audio signal channels $x_L(n)$ and $x_R(n)$ are then transmitted to an audio amplifier 22 for amplifying the audio signals before they are emitted via the loudspeakers 11. The filtered audio signal channels are also supplied to an echo compensation unit 23 where the audio signal components of a detected sound signal (not shown) may be removed. The audio signals emitted from the loudspeakers 11 propagate in the environment and may be diffracted different times before they are detected by one or more the microphones 13. The detected sound signal, comprising audio signal components as emitted by the loudspeaker 11 and also comprising speech signal components (such as from one or more of the passengers) are then fed to a processing unit 24 where linear processing (beam forming etc.) of the detected sound signal can be done. The output signals of the two units 23 and 24 are then fed to a subtracting unit 25 where the signal output from the echo compensation unit 23, $\hat{d}(n)$, is subtracted from the detected signal output from the processing unit 24, d(n). The subtraction results in an error signal as discussed further below. The better the echo compensation can simulate the signal path from the loudspeakers 11 to the microphone 13, the smaller is the error signal e(n).

In the following, an example of the compensation of audio signal components according to the implementation illustrated in FIG. 2 will be discussed in more detail. The explanation is done on the basis of a stereo signal source. However, the following explanation is also valid for an audio signal having multiple channels, such as five channels for a DVD. The radio signal of the left audio channel $x_L(n)$ and of the right audio channel $x_R(n)$ of the example stereo signal are output via one or more loudspeakers 11 and reach the microphone(s) 13 after having passed the interior of the vehicle. The audio signal component detected by the microphone(s) 13 comprises the direct audio signal as well as signal components diffracted, for example, by obstacles in the path of the sound signals. This signal transmission from the loudspeaker 11 output to the microphone 13 as illustrated in FIG. 2 can be described with finite pulse responses:

$$h_L(n)=[h_{L,0}(n),h_{L,1}(n), \ldots ,h_{L,L-1}(n)]^T \quad (1)$$

$$h_R(n)=[h_{R,0}(n),h_{R,1}(n), \ldots h_{R,L-1}(n)]^T \quad (2)$$

The index n in equations (1) and (2) indicate the time dependence of the pulse responses. In one example, the signal path from the loudspeaker 11 to the microphone 13 is simulated by filtering the audio signal in such a way that after filtering, the filtered audio signal corresponds substantially to the audio signal as it was detected by the microphone 13. In this case, the unwanted audio signal component can be removed from the sound signal by subtracting the simulated audio signal component from the detected sound signal.

For compensating the acoustic echoes, one or more adaptive filters having the following pulse responses can be used:

$$\hat{h}_L(n)=[\hat{h}_{L,0}(n),\hat{h}_{L,1}(n), \ldots , \hat{h}_{L,N-1}(n)]^2 \quad (3)$$

$$\hat{h}_R(n)=[\hat{h}_{R,0}(n),\hat{h}_{R,1}(n), \ldots , \hat{h}_{R,N-1}(n)]^2 \quad (4)$$

Normally, digital filters are used having a large number of filter coefficients, e.g. 300-500 coefficients. The audio signal components as received by the microphones 13 can then be removed by subtracting the simulated signal component from the detected sound signal. The resulting signal is called an error signal e(n) and is defined as follows:

$$e(n) = d(n) - \sum_{i=0}^{N-1} \hat{h}_{L,i}(n)x_L(n-i) - \sum_{i=0}^{N-1} \hat{h}_{R,i}(n)x_R(n-i). \quad (5)$$

The signal d(n) is either the signal from the microphone 13 or the signal of a linear time invariant processing. A good compensation of the audio signal component can be achieved when the estimated pulse response corresponds to the actual pulse responses and when a sufficient number of coefficients are used. In echo compensation systems, the left and the right audio signal channels can have very different cross correlation characteristics. When music is reproduced as an audio sound signal, the square of the modulus of the coherence may be defined as:

$$C(\Omega) = \left| \frac{S_{XLXR}(\Omega)}{\sqrt{S_{XLXL}(\Omega)S_{XRXR}(\Omega)}} \right|^2 \quad (6)$$

$C(\Omega)$ normally has values of $C(\Omega)<1$. When reproducing a news signal or other signal comprising one speaker, the left and the right audio signals may be linearly dependent signals, meaning that the coherence is approximately 1. In the above-shown equation (6) the values $S_{xLxR}(\Omega)$, $S_{xLxL}(\Omega)$ and $S_{xRxR}(\Omega)$ are called the cross power spectral density or auto power spectral density of the left and right audio signal channels $x_L(n)$ and $x_R(n)$. When one of the audio signal components is an audio component that depends linearly on the other component, the adaptation algorithm compensating the acoustic echoes may not have a non-ambiguous single solution.

Figure 3:
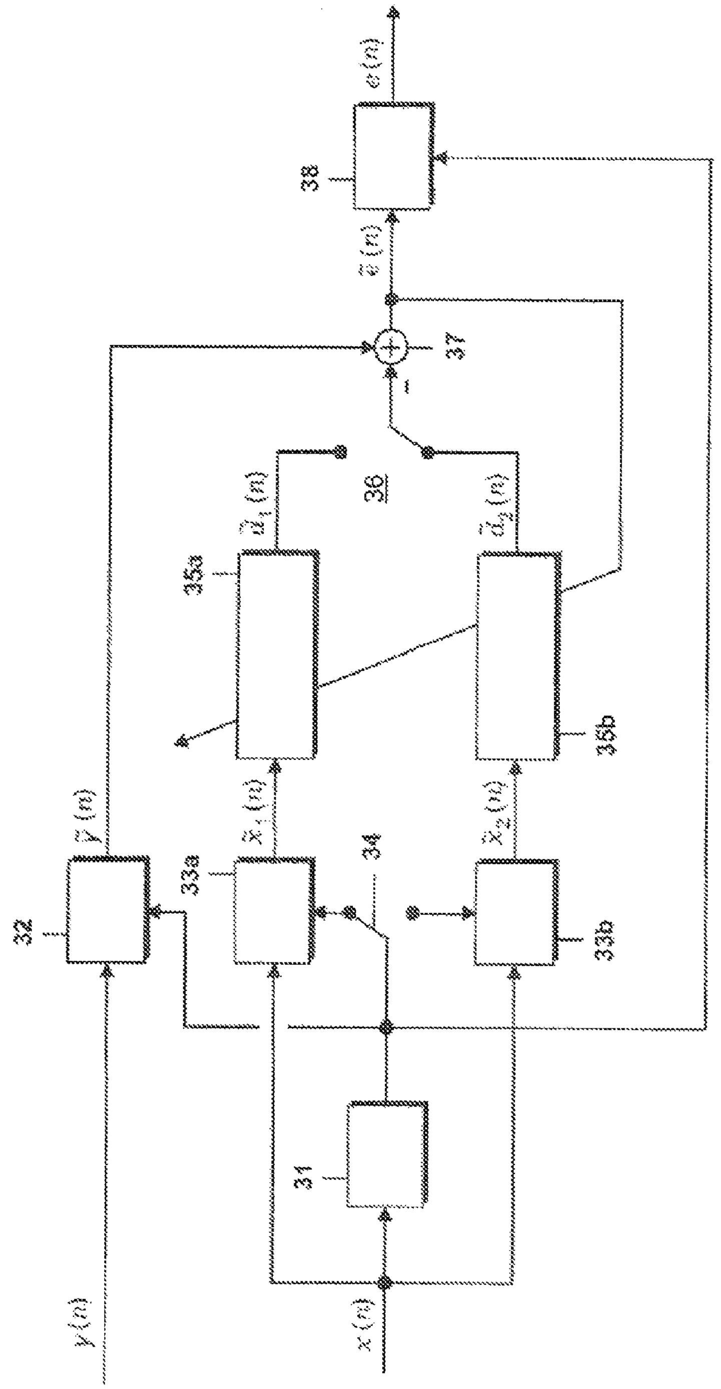
FIG. 3 shows a one example of an implementation of an echo compensation system in greater detail.

FIG. 3 shows one implementation of an echo compensation system in greater detail. In FIG. 3, the sound signal as detected by the microphone 13 comprising the audio signal component and the speech signal component is shown by y(n), and the audio signal itself (in this case, one channel of the audio signal) is represented by the signal x(n). In the example shown in FIG. 3, time-dependent decorrelation filter coefficients are used. For calculating the time-dependent decorrelation filter coefficients, a calculation unit 31 is provided where the time-dependent filter decorrelation coefficients are calculated. The system of FIG. 3 may also include one or more decorrelation filters 32, 33*a*, 33*b* for whitening the different signal components. A first decorrelation filter 32 may be provided for whitening the sound signal as detected by the microphone 13. In addition, decorrelation filters 33*a* and 33*b* may be provided for filtering the audio signal itself. With decorrelated signals, it is possible that the echo compensation can be carried out faster and in a more effective way.

In the example illustrated in FIG. 3, the audio signal x(n) may be processed in predetermined time intervals, and for each time interval the filter coefficients may be calculated. The filter coefficient of the first interval, e.g., an audio signal of 100 ms, once calculated by the calculation unit 31, may be supplied to the first filter 33*a* through a switch 34. When the first filter 33*a* has received a predetermined amount of input samples (e.g., 500 samples), the switch 34 switches to the second filter 33*b*, and the calculated filter coefficients calculated by calculation unit 31 are then transmitted to the other decorrelation filter 33*b*. The switch 34 switches every N cycles, N being the length of the echo compensation filters 35*a* and 35*b*. During the time the filter coefficients are supplied to the first decorrelation filter 33*a*, the echo compensation filter 35*b* may be used for the actual echo compensation. When the input samples for the echo compensation filter 35*a* have been completely renewed, the switch 34 changes its position and transmits the calculated filter coefficients to the filter 33*b*.

The audio signals are filtered by the echo compensation filters 35*a*, 35*b* in such a way that the signal path in the vehicle is simulated. The echo compensation filters 35*a*, 35*b* determine the pulse response between the loudspeaker and the microphone. This can be done by using gradient methods and using least mean square (LMS) algorithms or normalized least mean square algorithms (NLMS). These methods and algorithms are known in the art and will not be discussed in detail.

When the acoustic path of the vehicle is simulated in the echo compensation filters 35*a* and 35*b*, the output signal is then fed to another switch 36, the switch 36 switching every N cycles, so that the filtered signals from echo compensation filter 35*a* are transmitted to the subtracting unit 37 for N cycles, before the switch 36 is switched and the signal from the echo compensation filter 35*b* is fed to the subtracting unit 37 for the next N cycles.

In the foregoing example, the two switches 34 and 36 change their respective states every N cycles, while at the same time each respectively maintaining a different actual state. Thus, when the switch 34 supplies data to the upper branch 33*a* and 35*a*, the switch 36 receives signal data from the lower branch 33*b* and 35*b*. In this example, the signal parameters in the filters 33*a* and 33*b* are renewed every 2N cycles, where the signal parameters in the filter 32 are renewed every N cycle. The output signal of filter 32 and the output signal of the echo compensation filters 35*a* or 35*b* are then used in the subtracting unit where the simulated signal from the respective echo compensation filter 35*a*, 35*b* is subtracted from the filtered sound signal as detected by the microphone 13. The result is a whitened error signal $\tilde{e}(n)$ As it is known in adaptive filter systems, this whitened error signal $\tilde{e}(n)$ is then used as a feedback control signal to adapt the audio signal echo compensation filters. The whitened error signal $\tilde{e}(n)$ is then transmitted to an inverse filter 38 for removing the decorrelation. This inverse filter 38 also receives the calculated filter parameters every N cycles. The resulting error signal e(n) output from the inverse filter 38 then corresponds to the signal that will be output through the loudspeakers of the communication system. In this error signal e(n), the audio signal component is removed or suppressed. With the system shown in FIG. 3, a changing audio signal source, such as a change from a piece of music to a person speaking, can be detected within N cycles, and the decorrelation filters can follow this change in music also in N cycles.

In the example shown in FIG. 3, the signal processing is shown for one channel of the audio signal x(n). It should be understood that this structure of the two filter branches together with the two switches can be applied for each audio channel or certain selected audio channels. Thus, the echo compensation system may comprise a plurality of decorrelation filters for whitening the audio signal and the sound signal before the echo compensation, where one decorrelation filter is provided for each channel of the audio signal. By way of example, as explained above, the channel shown in FIG. 3 may be the left channel of a stereo signal, and the right channel ($x_R(n)$) of the stereo audio signal may utilize a second filter coefficient calculating unit having another two branches of filters. In this example, the filtered audio signal for the right channel may then be combined with the filtered audio signal for the left channel before the combined signal is transmitted to the subtracting unit 37. In the subtracting unit, the detected sound signal comprises all of the individual audio channels, each channel having been processed as shown in FIG. 3, the different channels being combined before they are transmitted to the subtracting unit 37.

Figure 4:
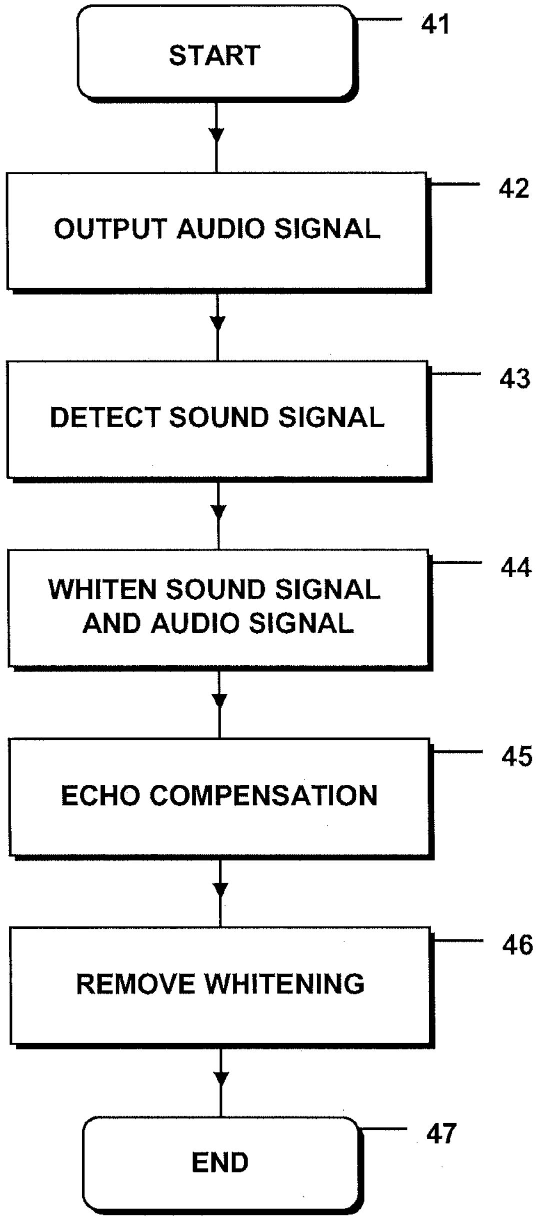
FIG. 4 is a flowchart illustrating a first example of an implementation of a method for compensating audio signal components in a communication system.

FIG. 4 is a flowchart illustrating an example of an implementation of a method for compensating audio signal components in a communication system. The method of FIG. 4 uses time-dependent filter coefficients. The method starts at step 41. First, an audio signal from an audio source is output via the loudspeakers (step 42). When an in-vehicle communication system is used, a microphone may be provided for detecting a sound signal in the vehicle (step 43). The detected sound signal may comprise components of the audio signal output via the loudspeakers, as well as speech signal components corresponding to speech signals from one or more passengers. Thus, the detected sound signal detected in step 43 generally comprises two different components—the audio signal component and a speech signal component. Next, the detected sound signal and the audio signal are whitened (step 44).

After whitening 44 (also referred to as decorrelating, since the whitening of a signal decorrelates the different channels of the signal), the acoustic echoes are compensated by compensating the audio signal components in the sound signal (step 45). This compensation may be carried out as explained in connection with FIG. 3 using time-dependent decorrelation filter coefficients and using alternating compensation units. Next, the whitening of the different signals is removed in step 46 resulting in an improved error signal and the method ends at step 47.

Figure 5:
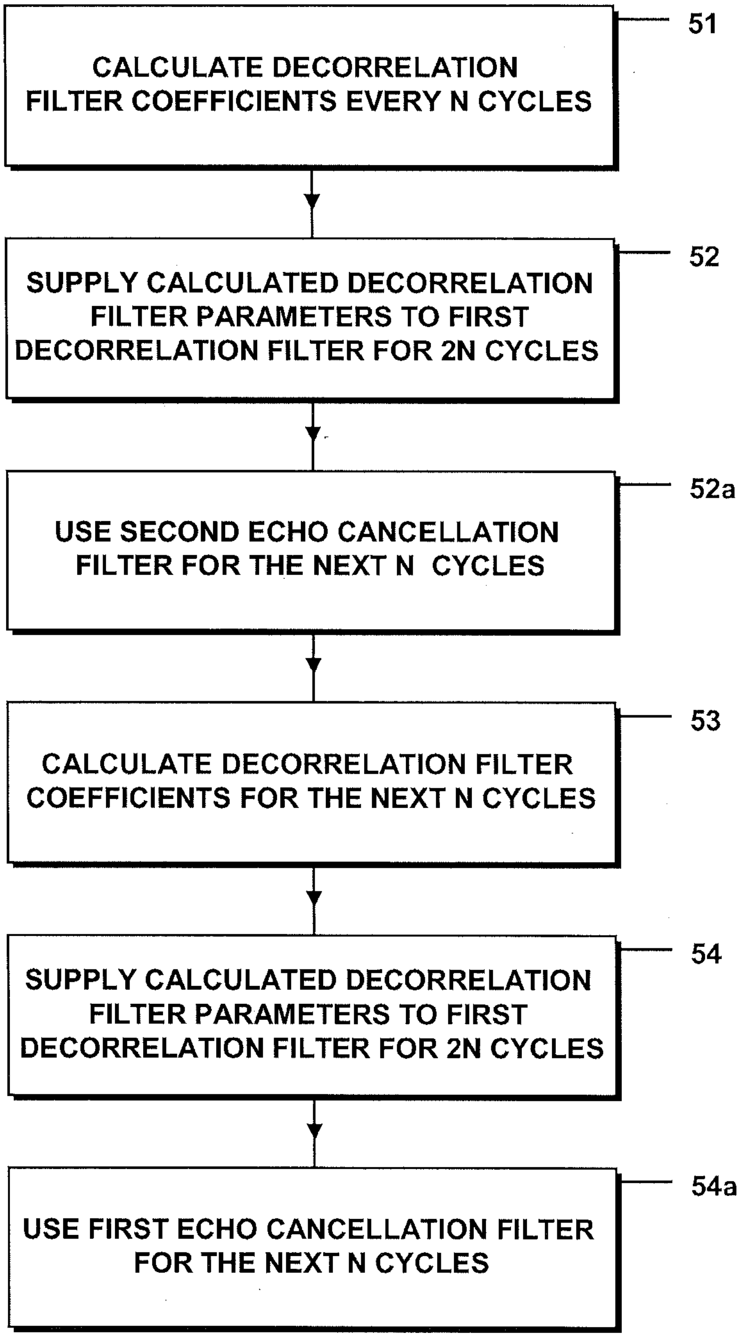
FIG. 5 shows in further detail a flowchart comprising the steps for using time-dependent filter coefficients for decorrelation.

FIG. 5 shows in further detail a flowchart comprising the steps for using time-dependent filter coefficients for decorrelation. In particular, the alternating transmission of the filter coefficients for the decorrelation filter is described in greater detail with respect to FIG. 5. As previously explained, according to this aspect of the invention, the whitening of the audio signal may be performed using at least two filters in an alternating way, each filter having time-dependent filter coefficients. When time-dependent filter coefficients are used, the actual characteristic of the audio signal may be taken into account. Accordingly, it is not necessary to use an average signal characteristic, as the filtering may be adapted to the actual audio signal. In this method, when one filter is being used for filtering, the other filter may continue to receive the audio signal so that filter coefficients for this new part of the audio signal can be calculated. With the use of time-dependent filter coefficients, the actual speed of the echo compensation filter compensating the audio signal components can be improved. Furthermore, the use of two different filters in an alternating way may help to keep signal processing power low.

As illustrated in FIG. 5, the audio signal from the audio signal source is first supplied to a calculation unit 31 where the time-dependent filter coefficients are calculated for the decorrelation filters every N cycles (step 51). The filter coefficients are typically calculated based on the audio signal itself (step 51), the filter coefficients being renewed every N cycles, N being the length of the compensation filter. By way of example, the length of the echo compensation filter may be chosen in such a way that it comprises 500 filter coefficients (i.e. N=500). Accordingly, in step 51, according to this example, the calculated filter parameters are calculated by calculation unit 31 (see FIG. 3) every 500 (“N”) cycles.

Next, the filter coefficients calculated by the calculation unit 31 based, in this example, on the last 500 (N) cycles or input samples are transmitted to the first decorrelation filter **33*a* (step 52), which will use and/or store this set of filter coefficients for 2N cycles. During the time the filter coefficients are being calculated for the decorrelation filter 33*a* (i.e., the first N cycles), the other echo compensation filter 35*b* is being used (step 52*a*). The calculated filter coefficients calculated for the next N cycles are calculated in step 53 and are then transmitted to the other decorrelation filter 33*b* (step 54). For this next N cycles during which new filter coefficients are being calculated, the first echo compensation filter 35*a* is used (step 54*a*). In the method described with respect to FIG. 5, the audio signal for a given decorrelation filter, once whitened or decorrelated, may then be supplied to a switch 37**, the switch changing every N cycles from one echo compensation filter to the other from where the signal is transmitted to the subtracting unit where it is subtracted from the whitened sound signal.

When the filter coefficients are supplied to the first decorrelation filter **33*a* as shown in FIG. 3 (step 52), the filter coefficients calculated the N cycles before are used for decorrelation and for compensating the audio signal component in filter 33*b* and 35*b*. The echo compensation filters 35*a* and 35*b*** may each include a memory storage unit in which the signals which were decorrelated with old filter parameters may be stored. When the filter parameters of the decorrelation filters are changed, the decorrelation of the signal in the echo compensation filters may be removed, and then the signal may be decorrelated with the new filter parameters. For this kind of filtering, high computer power may be used to do the calculations. With the use of two different decorrelation filters and two different echo compensation filters which are used in an alternating way the amount of computer power required may be reduced.

Figure 6:
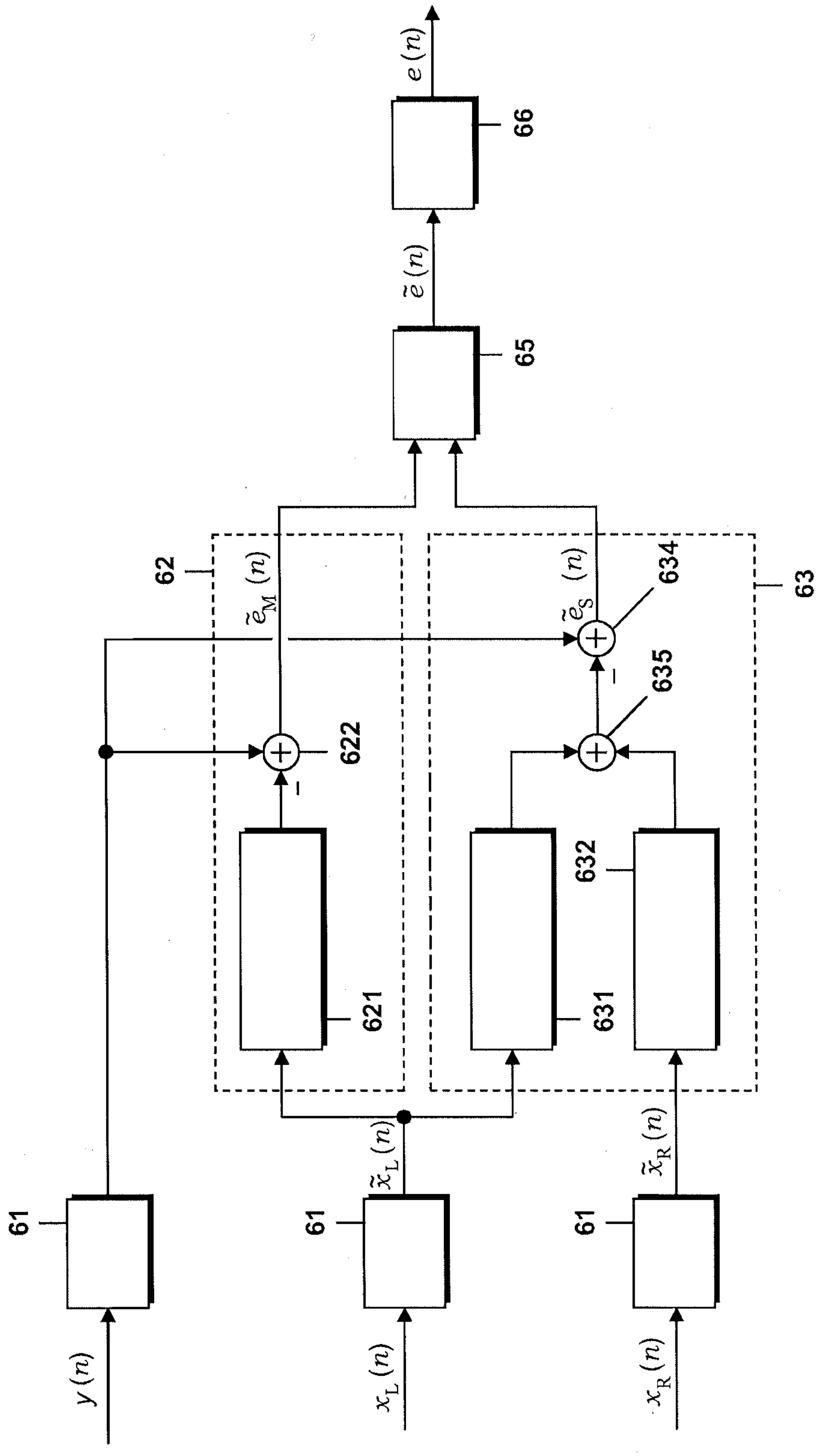
FIG. 6 shows an example of an implementation of a dual echo compensation system in greater detail.

FIG. 6 shows an example of an implementation of a dual echo compensation system in greater detail. The dual echo compensation system of FIG. 6 uses two echo compensation units in combination—a mono echo compensation unit 62 and a multi-channel echo compensation unit 63. Generally, in the example of FIG. 6, mono echo compensation and multichannel or “stereo” echo compensation are carried out at the same time, and the compensation achieving the more desirable results is used. Again, the signal y(n) in this example represents the sound signal detected by the microphones 13 comprising the audio signal component and the speech signal component. The detected sound signal is supplied to a decorrelation filter 61 for whitening the detected sound signal.

In the example of FIG. 6, echo compensation of a stereo signal is shown. The stereo signal has a first audio channel $x_L(n)$ and the second audio channel $x_R(n)$. These two signals are supplied to decorrelation filters 61 for whitening the audio signal as was discussed in connection with FIG. 3. The whitened left audio signal is then input into a mono echo compensation unit 62 and to a stereo echo compensation unit 63. The mono echo compensation unit 62 comprises an echo compensation unit 621 where the audio signal component of the sound signal as detected by the microphone is simulated. The simulated audio signal is then input into a subtracting unit 622 where it is subtracted from the whitened sound signal resulting in a whitened mono error signal $\tilde{e}_M(n)$. The left audio channel is, after passing the decorrelation filter 61, also input into the stereo echo compensation unit 63 where it is fed to an echo compensation unit 631 where the signal path is simulated as in the other echo compensation unit 621 and as described in connection with FIGS. 1-5. Additionally, the whitened audio channel is, after passing the decorrelation filter 61, fed to a second signal compensation unit 632. The output signals of the two echo compensation units 631 and 632 are combined in the adder 635 before this combined signal is subtracted from the whitened sound signal in subtracting unit 634. The output signal of the subtracting unit 634 is a whitened stereo error signal $\tilde{e}_x(n)$.

The system of FIG. 6 now has two output error signals, a mono error signal $\tilde{e}_M(n)$ and a stereo error signal $\tilde{e}_x$, (n). Depending on the actual composition of the audio signal, either the mono echo compensation unit or the stereo echo compensation unit achieves a more desirable result in removing the audio signal component in the detected sound signal. When the audio signal is a mono signal or a linearly dependent stereo signal, the mono echo compensation unit will generally achieve the more desirable compensation results. Additionally, the mono echo compensation is generally faster. When the audio signal is a stereo signal having non-linearly dependent signal components, the stereo echo compensation unit will be able to compensate acoustic echoes. In order to compare the two signals, a comparison unit 65 is provided having two inputs, one input being the output of the mono echo compensation unit $\tilde{e}_M$ (n), one input being the output of the stereo echo compensation unit $\tilde{e}_s(n)$. Comparison unit 65 compares the signal power of the two error signals and selects the signal having the lower signal power as an output signal $\tilde{e}(n)$. This output signal $\tilde{e}(n)$ of the comparison 65 unit is then transmitted to an inverse decorrelation filter unit 66 removing the whitening of the echo compensated signal. The output error signal e(n) is then the signal that might be output by the loudspeakers in which the audio signal components were effectively removed.

The echo compensation unit shown in FIG. 6 can be single filters compensating the echo. However, it is also possible to combine the mono and the multi-channel echo compensation with the time-dependent filter coefficients described in connection with FIGS. 1-5. This means that for each audio channel, a filter coefficient calculating unit such as calculation unit 31 would be provided, and each of the echo compensation units 621, 631 and 632 may be an echo compensation unit as shown in FIG. 3 comprising a switch for supplying the calculated decorrelation filter coefficients to one of the two branches of each echo compensation unit, another switch being provided for supplying the echo compensated signal to the subtracting unit. In this implementation of the invention, the time-dependent filter coefficients would be combined with the mono and multi-channel echo compensation units.

Figure 7:
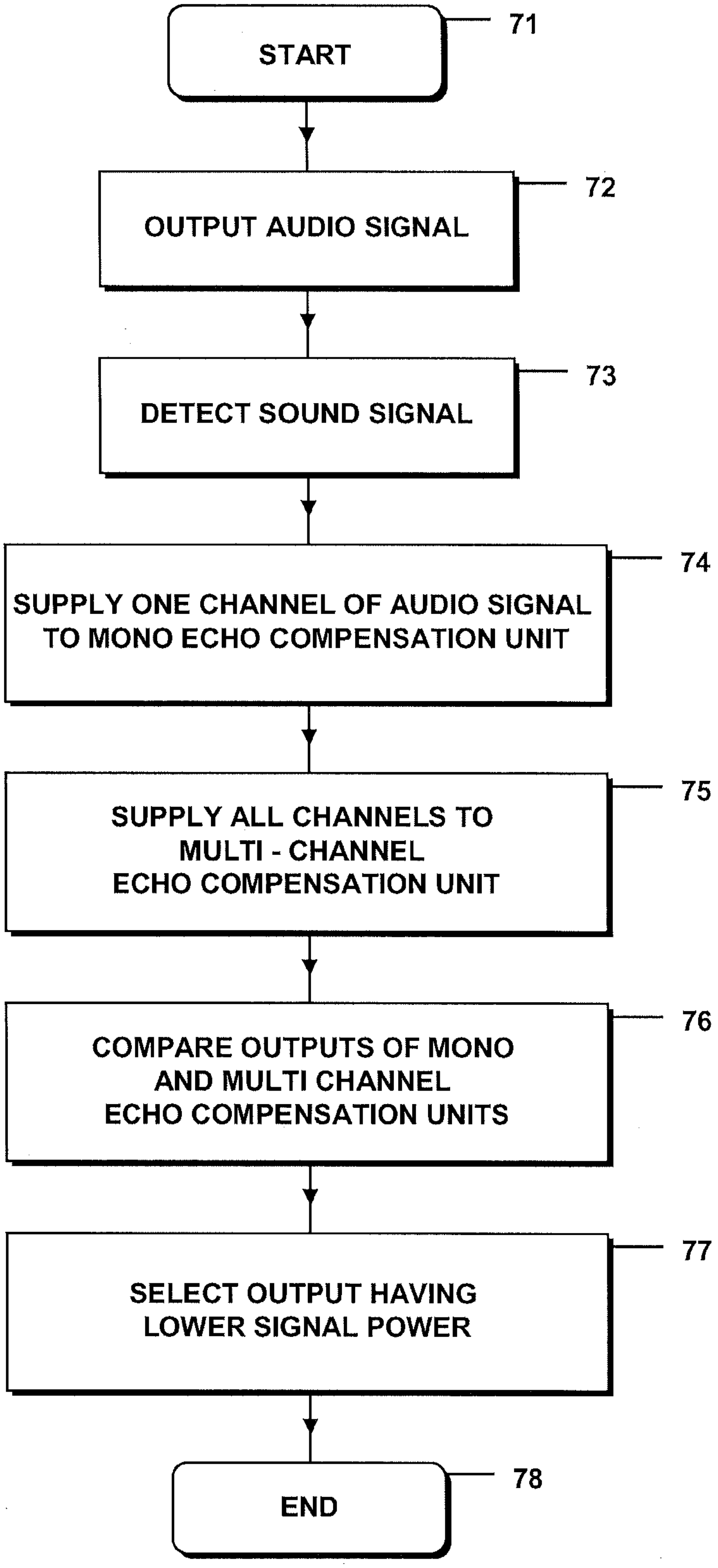
FIG. 7 is a flowchart illustrating another example of an implementation of a method for compensating audio signal components in a communication system.

FIG. 7 is a flowchart illustrating another example of an implementation of a method for compensating audio signal components in a communication system. According to the method of FIG. 7, a mono echo compensation unit and a multiple channel echo compensation unit are used in combination. The method of FIG. 7 starts at step 71. According to this method, the audio signal is output via the loudspeaker in step 72. In step 73 a sound signal is detected by the microphone, the sound signal having a speech signal component and an audio signal component. In one example, the audio signal components may be removed in the detected sound signal, thus compensating any acoustic echoes. According to this example, the compensation may comprise two different components. One channel of the audio signal may be supplied to a mono echo compensation unit in step 74, and in step 75 two or more channels of the multi-channel audio signal are supplied to a multi-channel echo compensation unit. In both echo compensation units, the echo compensation is carried out, be it with time invariant decorrelation filter coefficients or be it in connection with time-dependent decorrelation filter coefficients as described in connection with FIGS. 1-5. In the next step 76, the output of the mono echo compensation unit is compared to the output of the multi-channel echo compensation unit. In step 77, the signal output having the lower signal power is selected and used as an echo compensated output signal of the sound signal detected by the microphones 13. The method ends in step 78.

When a mono audio signal or a multi-channel (stereo) audio signal having two linearly dependent signal channels is emitted through the loudspeakers, a mono echo compensation unit may achieve more desirable results than a multi-channel stereo echo compensation unit. When the sound signal has non-linearly depending signal channels, the stereo echo compensation unit can compensate the audio signal components in the sound signal and therefore the acoustic echoes more effectively. As both filters in the example described with respect to FIGS. 6 and 7 are used in parallel, the compensation unit having the more desirable result is selected. Thus, by using two different echo compensation units, a non-linear processing of the audio signals before the acoustic echoes are removed is not necessary, and the non-linear decorrelation of the audio signals as a further step may be omitted. Moreover, this use of two different echo compensation units may improve signal quality.

Furthermore, in the case of a linearly dependent stereo signal or a mono signal, (e.g., an interview or other speech-only audio signal), the use of two different compensation units may increase the speed of echo compensation, as the mono echo compensation unit finds a solution in the approximation method much faster than the multi-channel echo compensation unit. Further, when the audio signal changes, for example, from a piece of music to a person speaking, the echo compensation may be adapted more quickly with a mono and multi-channel echo compensation unit operating in parallel, than it would be if only a multi-channel echo compensation unit were used. Moreover, the output from the echo compensation unit that would achieve the best echo compensation result (e.g., the mono echo compensation unit or the multi-channel echo compensation unit) may be selected.

In accordance with the system described with respect to FIGS. 6 and 7, echo compensation may be carried out for each channel of an audio signal in the multi-channel echo compensation unit, the echo compensated signals of each channel being added before the resulting signal is compared to the signal output of the mono echo compensation unit. Furthermore, before carrying out the echo compensation, a linear decorrelation can be carried out for whitening the audio signal as discussed above. When the audio signal is a stereo signal, two channels of the audio signal may be supplied to a multi-channel echo compensation unit, and one channel of the audio signal may be supplied to the mono echo compensation unit. Furthermore, the echo compensation may be carried out by simulating the audio signal components of the sound signal as they are detected by the microphone 13 in the mono echo compensation unit and the multi echo compensation unit and by subtracting the mono and the multi-channel simulated audio signal components from the detected sound signal comprising both components. This subtraction results in a mono and a multi-channel error signal, the power of the mono error signal and the power of the multi-channel error signal being compared in order to select the signal having the lower signal power. In order to improve the echo compensation time-dependent filter coefficients can be used for whitening the sound signal and for whitening the audio signal as was discussed in connection with the first aspect of the invention. Alternatively, the echoes may be compensated as discussed above in connection with the time-dependent filter coefficients, with two different filters being used in an alternating way as discussed above.

Figure 8:
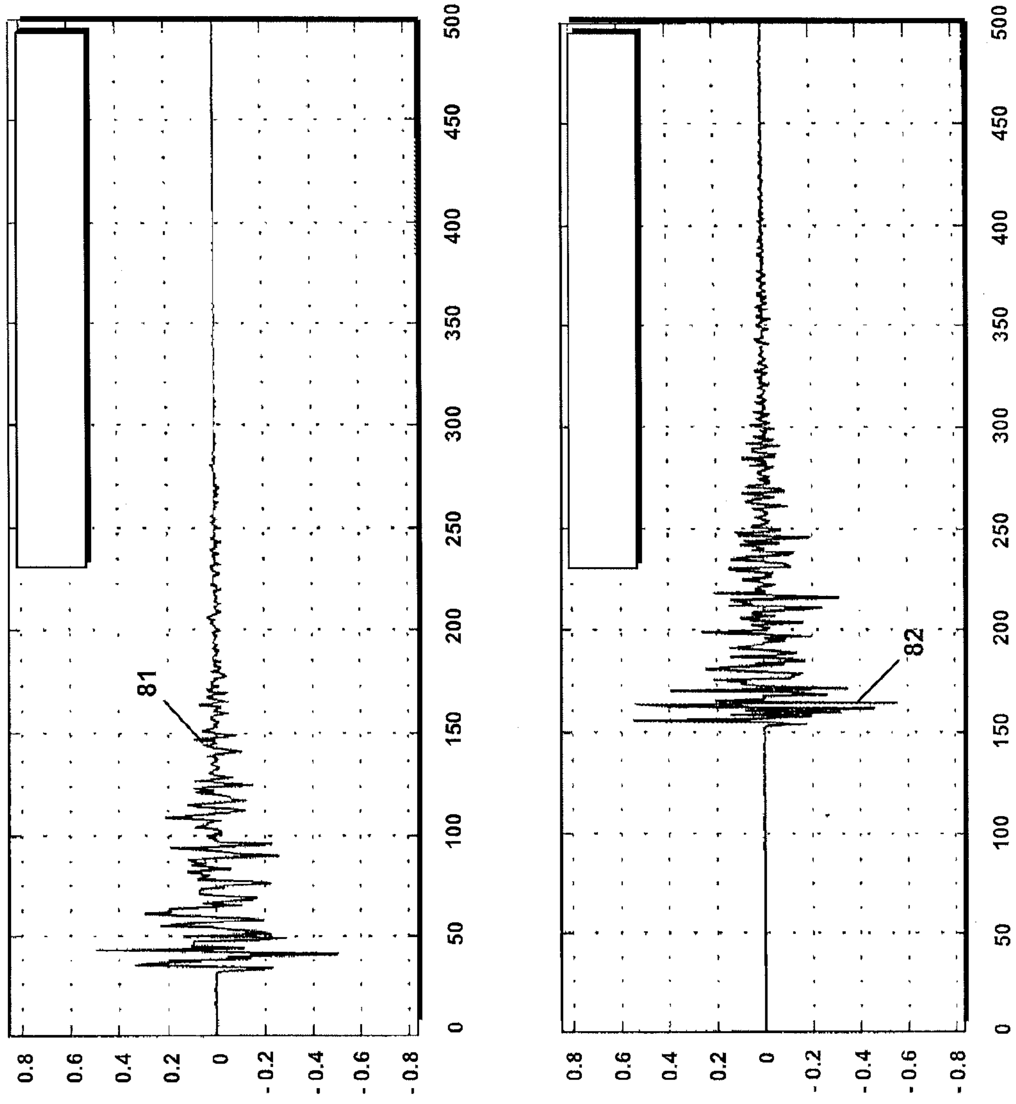
FIG. 8 shows pulse responses of an audio signal in a stereo amplification mode and in a surround sound mode.
Figure 9:
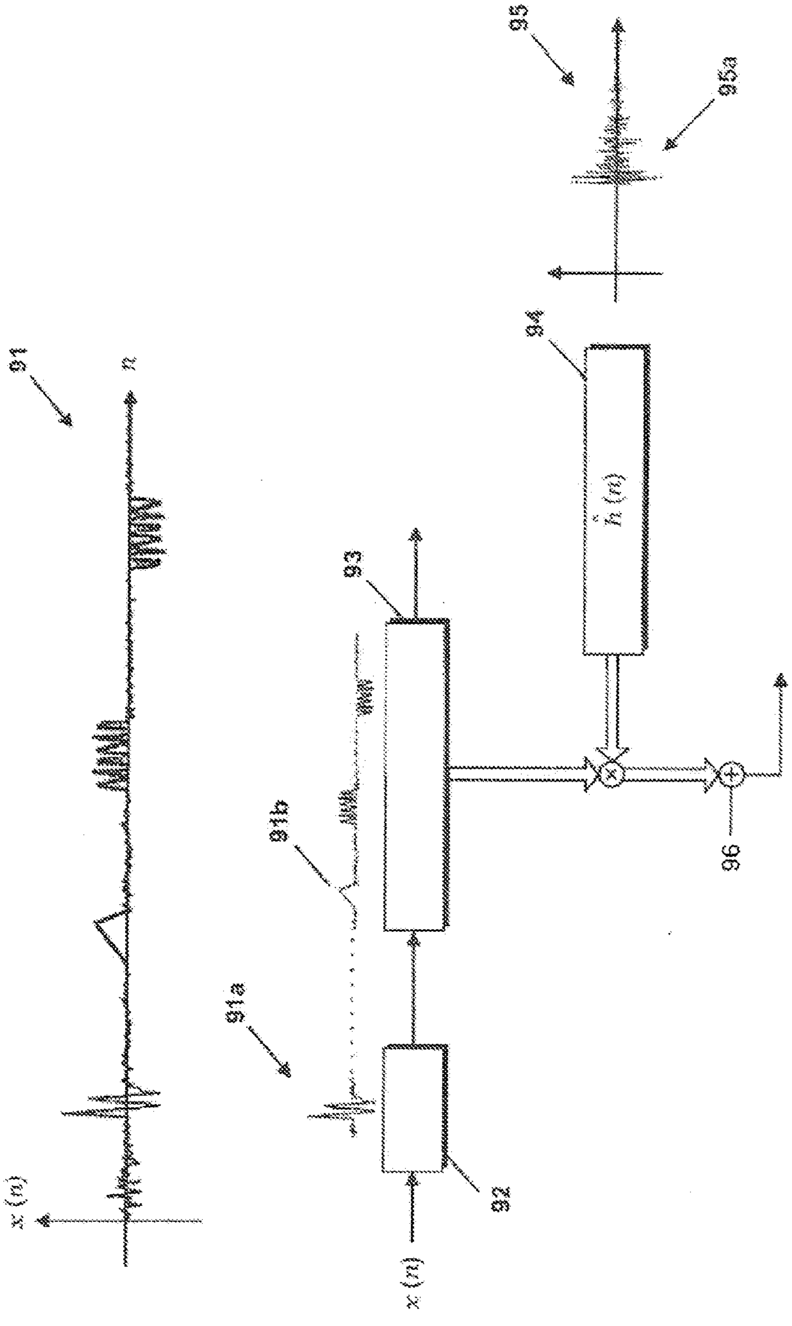
FIG. 9 shows an echo compensation system introducing a variable time delay during an echo compensation.
Figure 10:
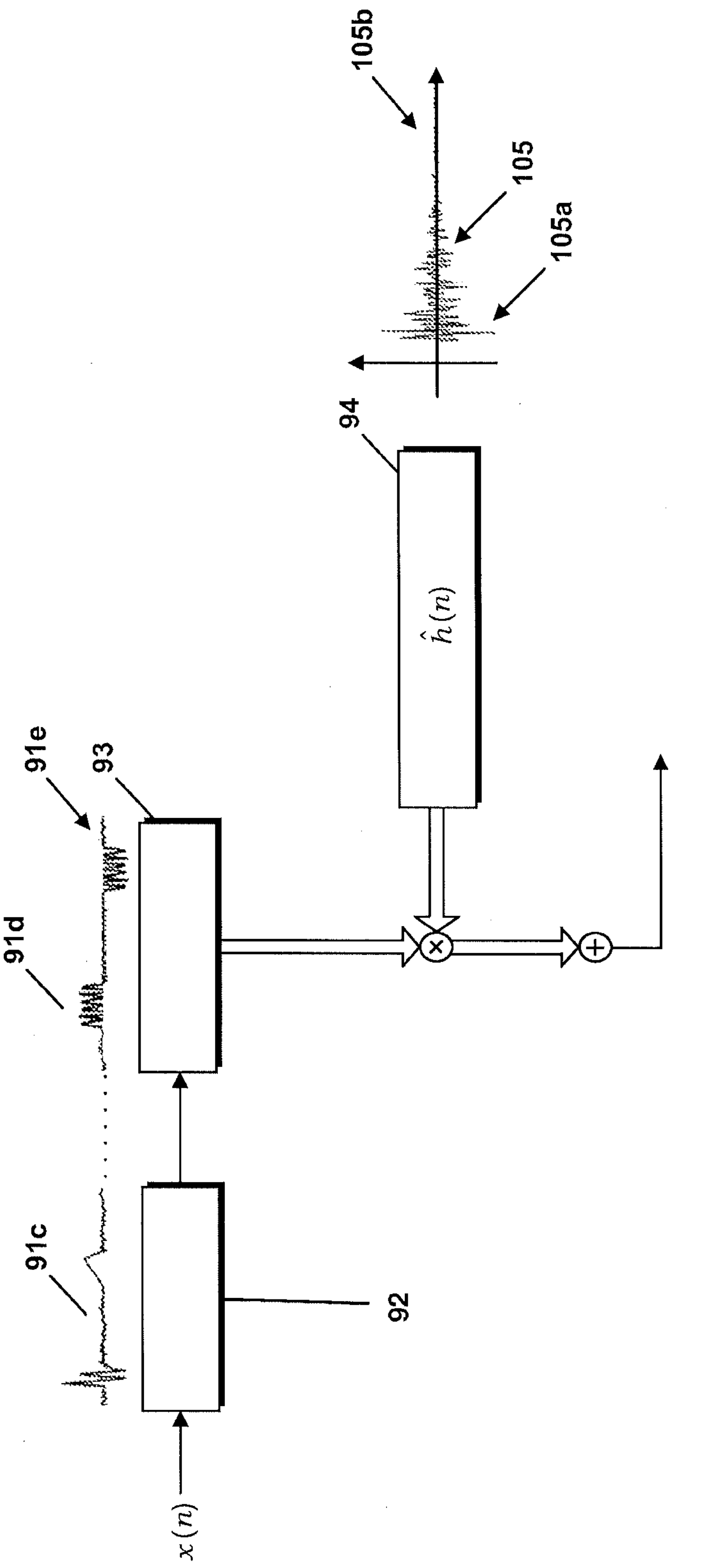
FIG. 10 shows the echo compensation system of FIG. 9 after changing the variable time delay of the echo compensation.

FIG. 8-10 illustrate a further aspect of one implementation of the invention. FIG. 8 shows pulse responses of an audio signal in a stereo amplification mode and in a surround sound mode. Specifically, the upper graph 81 of FIG. 8 illustrates a pulse response of a stereo amplification mode, and the lower part of FIG. 8 shows a graph 82 of a pulse response of an audio signal in a surround sound mode. As can be seen by the comparison of the two graphs 81 and 82, an additional time delay was introduced in the audio signal in the surround sound mode.

FIG. 9 shows part of an echo compensation system introducing a variable time delay during an echo compensation. In the implementation of FIG. 9, a loudspeaker of the system may output the audio signal and the sound signal received by the microphone or microphones. In general, as previously explained, an echo compensation unit may compensate acoustic echoes by simulating the audio signal components in the sound signal as they were detected by the microphone and by subtracting the simulated audio signal components from the detected sound signal. Also as previously explained, the echo compensation unit may comprise a filter for filtering the audio signal to obtain the pulse response of the audio signal. In addition to the filter, a delay element introducing a variable time delay into the audio signal before filtering may be provided, a delay control unit being provided controlling the delay element in such a way that the maximum of the pulse response is located within a predetermined range of filter coefficients of the filter. The delay element introducing a variable time delay into the audio signal before filtering allows keeping the length of the filter simulating the audio signal component as received by the microphone 13, at a constant length. The variable time delay introduced by the amplifier in the different reproduction modes is introduced by the delay element. Thus, it is not necessary to provide a length of the filter that would be able to simulate a maximum time delay introduced by the amplifier. This helps to keep the computation time comparatively low.

According to one implementation of the invention, the delay element comprises a delay element 92 of variable length, the delay element of variable length being connected to a signal memory 93 of the filter filtering the audio signal, the signal memory 93 of the filter having a constant length. With the delay element 92 of variable length it is possible to simulate the different time delays introduced by the amplifier of the audio signal. At the same time the signal memory 93 of the filter compensating the acoustic echoes can be of a relatively short length. In one example, the length of the delay element 92 is selected in such a way that the maximum of the pulse response calculated by the filter is located within a predetermined range of filter coefficients.

FIG. 9 will now be described in greater detail. In the upper part of FIG. 9, graph 91 shows an example view of an audio signal. The echo compensation filter comprises a delay element 92 receiving an audio signal or excitation signal 91. As previously stated, and as will be discussed further below, the delay element 92 is of variable length. The delay element 92 introduces a variable delay before the audio signal is transmitted to a signal memory 93 of the echo compensation filter. Additionally, a memory 94 for storing the filter coefficients of the adaptive filter is provided. As it is known to those skilled in the art, different entries of the signal memory 93 are multiplied with the filter coefficients and the different terms are added in an adder 96, resulting in an output signal of the adapted filter. Graph 95 shows the pulse response calculated by the filter. As can be seen by the indicated pulse response in graph 95, the maximum of the pulse response is located at a filter coefficient having a relatively large number.

At the beginning the filter coefficients are 0. This pulse response was calculated based on the predetermined length of the delay memory. Above, the part 91*a* of the audio signal 91 is shown, which is comprised in the delay element 92. The other part 91*b* of the audio signal 91 is comprised in the signal memory 93 of the filter. With the length of the delay element 92 shown in FIG. 9, a pulse response is calculated as shown by graph 95 having a maximum 95*a*, which is located at a filter coefficient having a relatively large number. When the pulse response 95 is interpreted, one can deduce from the position of the maximum of the pulse response that the time delay introduced by the delay memory was shorter than desired.

When it is detected that the maximum 95*a* of the pulse response is not located, at a predetermined filter coefficient, the pulse response is shifted as shown in FIG. 10. By shifting the pulse response as shown by graph 105, so that the maximum 105*a* is located at a predetermined position of the filter coefficients, the nonexisting parts of the pulse response can be filled, with zeroes as shown by the part 105*b* of the graph 105. In addition to the pulse response, the length of the delay element 92 is also adjusted. In the example shown the length of the delay element 92 is increased, so that a larger part 91*c* of the audio signal is now comprised in the delay element 92, where only a smaller part of the audio signal 91 *d* is now comprised in the signal memory 93 of the filter. The new parts of the audio signal generated by the increasing length of the delay element 92 can be filled with zeros as represented by part 91*e* of the graph shown in FIG. 10. When comparing the length of the respective delay elements 92 of FIGS. 9 and 10, it can be deduced that by varying the length of the delay element 92, time delays introduced in the different audio modes of an audio system can be simulated in an echo compensation unit. According to one implementation of the invention, the length of the delay element 92 can be controlled in such a way that the maximum of the pulse response is located at a filter coefficient which has a number around 30. It should be understood that any other number can be selected. However, the number of the filter coefficient at which the maximum of the pulse response is to be located may be selected in such a way that this filter coefficient is positioned at the beginning of the filter length. If the number is selected to be too small, the system may not be able to precisely detect whether the determined maximum of the pulse response is actually the maximum or whether the maximum is not represented in the filter coefficients. By way of example, if it is detected that the maximum of the pulse response is located within the first ten filter coefficients, it can be followed that the time delay introduced by the delay element is larger than desired. Accordingly, the length of the delay element 92 may be shortened and the impulse response may be shifted, i.e. the filter coefficients in the coefficient memory 94 may be shifted. Again, the added parts generated by the shifting are filled with zeroes.

This means that the direct sound as it is simulated by the echo compensation filter is situated at a predetermined filter coefficient of the filter. By way of example, the maximum of the pulse response can be arranged at a filter coefficient which is between one tenth and one twentieth of the maximum filter coefficient. By way of example, it is supposed that the filter compensating the acoustic echoes has a length of 500 coefficients. In this example the delay element may be controlled in such a way that the maximum of the pulse response in the calculated pulse response is positioned between the 20th and the 40th filter coefficient, preferably between the 25th and 35th filter coefficient, even preferably between the 28th and the 32nd filter coefficient.

Preferably, the maximum of the pulse response can be calculated by the following equation:

$$i_D(n)=\arg\max(|h_i(n)|\gamma^i). \quad (7)$$

As can be seen by equation (7), the coefficient representing the direct sound can be found by searching for the maximum of a weighted modulus of the pulse response. Preferably, the parameter γ is chosen to be between 0 and 1. By introducing this parameter γ, reflections of the sound signal may be attenuated relative to the direct sound. When the maximum of the pulse response in the simulated signal path in the echo compensation filter is found to be at a much larger filter coefficient, this means that the simulated time delay may be smaller than desired. In this case, a further time delay may be introduced. If, however, it is determined that the maximum of the pulse response is located at a filter coefficient having a number which is smaller than the number of the predetermined range, it can be followed that the simulated time delay may be larger than desired. In this case, the delay introduced by the delay element may be made shorter.

It should be understood that the implementations described in connection with FIGS. 9 and 10 can be combined with one of the implementations described in connection with FIGS. 1-5 and 6-7. It is also possible to combine all three aspects of the invention, meaning that the time-dependent decorrelation filter coefficients may be used in combination with the mono and multiple echo compensation units. Additionally, the echo compensation can be further improved by adjusting the time delay as described in FIGS. 9 and 10. By way of example, when time-dependent decorrelation filter coefficients are used, the calculation of the time-dependent filter coefficients can be stopped from time to time. When the calculation of the filter coefficients is stopped, the calculating power can be used to adapt the length of the delay element by calculating the position of the maximum of the pulse response, by verifying whether this position is within a predetermined range and if not, by shifting the pulse response and by adapting the length of the delay element accordingly.

Although the invention has been shown and described with respect to example implementations thereof, it should be understood by those skilled in the art that the description is example rather than limiting in nature, and that many changes, additions and omissions are all possible without departing from the scope and spirit of the present invention, which should be determined from the following claims.

We claim:

1. A method for compensating an audio signal components of an audio signal provided infirst and second channels, comprising:

receiving a sound signal from a microphone array;

detecting the audio signal component of the sound signal;

in response to the detected audio signal component of the sound signal, generating an echo compensated sound signal to compensate acoustic echoes in the sound signal due to the detected audio signal component, where the generating comprises:

supplying the first channel of the audio signal to a mono echo compensation unit;

generating filter coefficients fir the mono echo compensation unit compensate for the acoustic echoes;

providing for storage of the filter coefficients in a non-transitory storage medium;

supplying the first and second channels of the audio signal to a multi-channel echo compensation unit;

outputting to a comparison unit a first output associated with a first signal power from the mono echo compensation unit;

outputting to the comparison unit a second output associated with a second signal power from the multi-channel echo compensation unit;

comparing the first signal power and the second signal power in the comparison unit;

selecting the first output if the first signal power is smaller than the second signal power;

selecting the second output if the second signal power is smaller than the first signal power; and outputting the selected one of the first and second outputs for transmission to one or more loudspeakers.

2. The method of claim 1, further comprising:

filtering the sound signal in order to obtain a whitened sound signal before the step of generating the echo compensated sound signal, and inverse filtering the selected output.

3. The method of claim 1, where the step of generating an echo compensated sound signal further comprises:

outputting a first simulated audio signal component for the first channel and a second simulated audio signal component for the second channel using the multi-channel echo compensation unit; and adding the first and second simulated audio signals to obtain a combined simulated audio signal component.

4. The method of claim 2, further comprising calculating time-dependent filter coefficients to be used for obtaining the whitened sound signal.

5. The method of claim 3, further comprising:

subtracting a mono simulated audio signal component from the sound signal to obtain the first output, and subtracting the combined simulated audio signal component from the sound signal to obtain the second output.

6. A method for compensating audio signal components comprising:

detecting a sound signal including an audio signal component from an audio signal;

detecting in the audio signal a first channel and a second channel, and a speech signal component;

filtering the sound signal to obtain a whitened sound signal;

filtering the first channel to obtain a first whitened audio signal component;

filtering the second channel to obtain a second whitened audio signal component;

supplying the first whitened audio signal component and the whitened sound signal to a mono echo compensation unit;

outputting a first output having a first signal power from the mono echo compensation unit; supplying the first whitened audio signal component, the second whitened audio signal component, and the whitened sound signal to a multi-channel echo compensation unit;

outputting a second output having a second signal power from the multi-channel echo compensation unit; comparing the first signal power and the second signal power;

selecting the first output if the first signal power is smaller than the second signal power; and selecting the second output if the second signal power is smaller than the first signal power; and outputting the selected one of the first and second outputs for transmission to one or more loudspeakers.

7. An echo compensation system comprising:

a first module to receive from at least one microphone a sound signal comprising a detected audio signal component from an audio signal comprising at first channel and a second channel, and a speech signal component;

a mono echo compensation unit for receiving the first channel of the audio signal and outputting a first output having a first signal power;

a multi-channel echo compensation unit for receiving the first and second channels of the audio signal and outputting a second output having a second signal power; and a comparison unit for comparing the first signal power and the second signal power; and selecting the first output if the first signal power is lower than the second signal power, or the second output if the second signal power is lower than the first signal power to output the selected one of the first and second outputs for transmission to one or more loudspeakers.

8. The echo compensation system of claim 7, further comprising a plurality of filters to whiten the audio signal and the sound signal, and an inverse filter for inverse filtering at least one of the first output and the second output.

9. The echo compensation system of claim 8, where the plurality of filters includes at least one filter for the first channel and at least one filter for the second channel.

10. An echo compensation system comprising:

a module to receive a detected sound signal comprising a detected audio signal component from an audio signal comprising a first channel and a second channel, and a speech signal component;

a filter unit for generating, a whitened sound signal;

a plurality of filter units for outputting a whitened audio signal with a first whitened audio signal corresponding to the first channel and a second whitened audio signal corresponding to the second channel;

a mono echo compensation unit to receive the first whitened audio signal and with the whitened sound signal, and outputting a first output;

a multi-channel echo compensation unit to receive the first whitened audio signal, the second audio signal, and the whitened sound signal, and output a second output; and a comparison unit for comparing to compare a signal power of the first output and a signal power of the second output, and select whichever of the first output or second output has a lower signal power to output the selected one of the first and second outputs for transmission to one or more loudspeakers.

* * * * *